3,425,983
MINERAL-FILLED HYDROCARBON COPOLYMER COMPOSITION CONTAINING AN ORGANO-SILICON COMPOUND AND PROCESS OF PREPARING SAME
James Richard Wolfe, Jr., Wilmington, Del., assignor to E. I. du Pont de Nemours and Company, Wilmington, Del., a corporation of Delaware
No Drawing. Filed July 22, 1963, Ser. No. 296,432
U.S. Cl. 260—41.5       1 Claim
Int. Cl. C08f 45/58, 45/04, 29/02

ABSTRACT OF THE DISCLOSURE

Mineral loaded chain-saturated hydrocarbon copolymer compositions containing a stabilizing amount of organosilicon compound which is insoluble in water at 75° C. and the process of preparing such a composition wherein said mineral-filled hydrocarbon is cured in the presence of a stabilizing amount of said organosilicon compound.

---

Ethylene hydrocarbon copolymers, which can be sulfur cured to elastomeric vulcanizates, are of increasing commercial importance today for a wide variety of applications. Unfortunately, however, representative mineral loaded vulcanizates have not proven to be entirely satisfactory for use as high voltage insulators. Both the power factor and the S.I.C. (specific inductive capacitance) increase undesirably under test conditions.

As is well known to those skilled in the art, a power loss from transmission lines depends on the product of the dielectric constant (specific inductive capacitance) and the power factor of the insulation. The dielectric constant and the power factor (a measure of the loss angle of the insulation) depends on such factors as the water content of the insulation; for example, the larger the proportion of water, the greater the power factor. In order to keep the total power loss from a transmission line as low as possible, it is desirable that the power factor be as small as possible. Typical specifications with regard to power factors and their stability are contained in the IPCEA NEMA Standards Publication S–19–81, 3rd Edition, under specification 3.15 for rubber. In particular, the increase in the power factor under test conditions wherein the insulation is immersed in hot water should be very small.

The electrical properties of vulcanizates made from ethylene hydrocarbon copolymer gum stocks are satisfactory. However, gum stocks are not suitable for customary wire coating applications; the uncured gum stocks do not extrude satisfactorily for factory processing in wire coating applications and the vulcanizates have low tensile strengths. Stocks reinforced with carbon black process better and give very strong vulcanizates. However, stocks loaded solely with high proportions of carbon black and normally treated are poorly suited for wire coating applications; the power factor is too high.

In contrast to gum stocks, mineral loaded stocks can be extruded satisfactorily for wire coating; subsequent curing gives strong vulcanizates which exhibit initially a low power factor very suitable for electrical applications. Unfortunately, both the power factor and the specific inductive capacitance of these vulcanizates increase undesirably after test aging in hot water. Stocks containing both carbon black and mineral filler show similar results.

The electrical properties of vulcanizates containing clay or black (e.g. SRF or FT types) are improved if the filler/copolymer mixture is heat-treated (i.e. masticated at about 275–400° F.) before the curing agents are added. Heat treatment requires extra processing time and equipment, however.

It is, therefore, an object of the present invention to provide new mineral loaded chain-saturated hydrocarbon copolymer compositions which can be cured to vulcanizates having improved electrical properties obtained without heat treating the copolymer composition. A further object of the present invention is to provide mineral loaded hydrocarbon copolymer vulcanizates having these improved electrical properties. Another object of the present invention is to provide a process for preparing vulcanizates of mineral loaded chain-saturated hydrocarbon copolymers of at least one alpha-monoolefin and at least one non-conjugated diene, which vulcanizates display greatly improved power factor stability and specific inductive capacitance. Other objects will appear hereafter.

These and other objects are accomplished by the process which comprises curing a mineral, and optionally carbon black, filled chain-saturated hydrocarbon copolymer in the presence of an organosilicon compound, admixed therewith, which is insoluble in water at a temperature of about 75° C.

The resultant vulcanizate exhibits an exceptional improvement in the stability of both the power factor and the specific inductive capacitance. For example, when 100 parts of an ethylene/propylene/1,4-hexadiene copolymer were loaded with 40 parts of naphthenic petroleum oil and 120 parts of calcined clay and sulfur-cured, the initial power factor and S.I.C. were 0.37% and 3.15, respectively. After the vulcanizate had aged in water at 75° C. for 1 day, the power factor and the S.I.C. had climbed to 12.12% and 6.68, respectively. After the aging had been continued for 1 week in water at 75° C., the power factor of the vulcanizate remained at about 12% while the S.I.C. had climbed still higher to 7.05. In striking contrast, a similar vulcanizate additionally containing 3 parts of a organosilicon polymer in accordance with the present invention exhibited a power factor of only 3.5% and a S.I.C. of only 3.52 after similar aging for 1 day; after further aging had been carried out for a total of 14 days the power factor and the S.I.C. were only 1.65% and 3.82, respectively. Both the power factor and the S.I.C. of this vulcanizate, prior to aging, were essentially the same as those of the conventional vulcanizate not containing the organosilicon compound.

The hydrocarbon copolymer component of the vulcanizate compositions having improved electrical properties can be characterized as being chain-saturated and normally solid in the uncured state. The copolymers can also contain unsaturated side chains which provide sites for sulfur-curing. Such copolymers are preferably made from at least one alpha-monoolefin, and a non-conjugated hydrocarbon diene. Other suitable copolymers, which are essentially saturated, can be made from at least two alpha-monoolefins, one of which is preferably ethylene. The curing systems preferably added to these copolymers in a vulcanizing amount to obtain the cure are (1) for the sulfur-curable copolymers—sulfur, zinc oxide, and vulcanization accelerators such as thiuram sulfide, salts of dithiocarbamic acid, thiazole derivatives, sulfenamides, and aryl imidazole derivatives and (2) for the essentially saturated copolymers—a free radical generator such as dicumyl peroxide. The improved electrical properties of the mineral loaded copolymer vulcanizates are obtained by incorporating the organosilicon compound into the composition, prior to cure, along with the curing agents, or before or after them, and thereafter curing the composition.

The heart of the present invention, then, is the addition to the curable composition of an organosilicon compound which is essentially insoluble in water at about 75° C. When organosilicon compounds are employed which are soluble in water at 75° C., neither the power factor nor the S.I.C. is satisfactorily stabilized. The concentration of the organosilicon compound is not critical. Those skilled in the art can determine the optimum stabilizing amount by routine experimentation. It has been found that for some representative compounds the optimum concentration is 2 parts per 100 based on the weight of copolymer. In general, it is often desirable to add at least about 0.5 part of organosilicon compound in order to gain a decided improvement in the electrical properties; concentrations in the range of about 2–3 parts per 100 are even more desirable. It is to be understood that concentrations below 0.5 part can be employed; even very small amounts of organosilicon compound provide some stabilization in the electrical properties of the vulcanizate. There is often no need to employ concentrations above about 3 parts by weight.

The critical characteristic of an organosilicon compound used in the present invention is that it be essentially insoluble in water at 75° C. In other respects, the nature of the organosilicon compound can be quite varied. Thus, water insoluble monomeric vinyl or alkoxy silanes such as vinyltriethoxy silane, or vinyltris (2-methoxyethoxy) silane can be employed so long as their hydrolysis product is insoluble. Polysiloxane oils and solids can also be used. A particularly preferred material is the polysiloxane obtained by hydrolyzing 2(1,3-butadienyl) dichloro(methyl) silane. Compounds containing the units

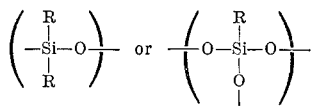

wherein R is lower alkyl are also useful. Such compounds include the polymeric gums made up of dimethyl siloxane units

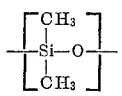

typical examples of such polymers have about 5,000 to 9,000 of these units in each chain. Still other polymers include these gums containing a small proportion of vinyl groups (less than ½ of 1% of the methyl groups being replaced by vinyl groups). In other representative polymers about 5 to 10% of the methyl groups on the silicon atoms have been replaced with an equal number of phenyl groups. Typical gums have brittle points in the range of —100 to —178° F. They are described more particularly in the bulletin 09–010 (May 1962) entitled "Compounding With Silastic® Brand Silicone Rubber and Bases," Dow-Corning Corp., Midland, Mich. Polydimethyl siloxane oils which can be used in the present invention are also characterized by the recurring structural units of the formula —O—Si(CH$_3$)$_2$— and are terminated by —Si(CH$_3$)$_3$ groups. A general review of their preparation is given by Rochow, "Chemical and Engineering News" 23, page 612; other references include U.S. Patent 2,258,218 and U.S. Patent 2,258,222. Silicones have been more particularly described in Chemistry of the Silicones, Rochow, 2nd edition, John Wiley & Sons, Inc., New York, 1951. Silicone rubber is described in Chapter 16 of Introduction to Rubber Technology, edited by M. Morton, Reinhold Publishing Corp., New York, 1959; Synthetic Rubber, G. S. Whitby, editor, John Wiley & Sons, Inc., New York, 1954, pages 910–918.

Any silicone polymer employed in the present invention should be capable of being homogeneously distributed, i.e., dispersible, throughout the copolymer stock by conventional methods such as the use of internal mixers or rubber roll mills. A silicone elastomer would be suitable if not yet cross-linked.

The preferred hydrocarbon copolymers are the normally solid copolymers of at least 1 alpha-monoolefin, and at least 1 non-conjugated hydrocarbon diene, preferably 1,4-hexadiene. The alpha-monoolefins have the structure R—CH=CH$_2$ where R is H or C$_1$–C$_{16}$ alkyl; straight-chain olefins are preferred. Representative dienes include: an open-chain C$_5$–C$_{22}$ diene having the structure:

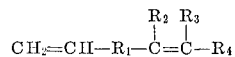

wherein R$_1$ is an alkylene radical, R$_2$, R$_3$, and R$_4$ are independently selected from the group consisting of H and alkyl; dicyclopentadiene; a 5-alkenyl-substituted 2-norbornene; 5-methylene-2-norbornene; a 2-alkyl-2,5-norbornadiene, cyclopentadiene; and 1,5-cyclooctadiene. When cyclic non-conjugated dienes are used for making elastomers, it is preferred that the copolymer contain at least about 80% by weight of monomer units from ethylene and at least one other alpha-monoolefin. The preferred copolymers are ethylene/propylene/1,4-hexadiene, ethylene/propylene/dicyclopentadiene and ethylene/propylene/5-methylene-2-norbornene. The copolymers containing monomer units of the open-chain non-conjugated dienes are more particularly discussed in U.S. Patent 2,933,480; copolymers containing dicyclopentadiene monomer units are described in U.S. Patent 3,000,866; copolymers containing alkyl norbornadiene monomer units are taught in U.S. Patent 3,063,973; copolymers containing the norbornenes are described in U.S. Patents 3,093,621 and 3,093,620. These copolymers have the special advantage of being sulfur curable to elastomeric vulcanizates, but the improved electrical properties are obtained by mineral loaded vulcanizates containing these copolymers as non-elastomeric copolymers as well.

The copolymers containing the representatively described dienes can be readily cured with sulfur. Any of the procedures familiar to those skilled in the processing of natural rubber, styrene/butadiene rubber (SBR), and other diene rubbers are suitable. In general, a combination of curing agents is used, comprising sulfur, zinc oxide, and a vulcanization accelerator, in an amount to impart the desired degree of vulcanization to the copolymers used in the present invention. In general about 0.5 to 2.5 parts of sulfur per 100 parts by weight of the copolymer are employed; it is to be understood that larger or smaller concentrations may be used when deemed desirable. The concentration of zinc oxide is important since it controls the ultimate state of cure in conjunction with sulfur and accelerator. At concentrations of 2 to 20 parts by weight per 100 parts by weight of the copolymer, the rate and state of cure are satisfactory. Concentrations below 2 parts are not satisfactory for developing and maintaining adequate vulcanizate properties. The vulcanization accelerators are selected from the group consisting of thiuram sulfides, salts of dithiocarbamic acid, thiazole derivatives sulfenamides and aryl imidazole derivatives of mixtures thereof. The thiuram sulfides and dithiocarbamates are generally preferred because they produce rapid curing without scorching and develop and maintain maximum physical properties even on extended curing cycles. Representative accelerators of this type include: tetramethylthiuram monosulfide; tetramethylthiuram disulfide; tetraethylthiuram disulfide; tetrabutylthiuram monosulfide; dipentamethylenethiuram tetrasulfide ("Tetrone A"); the zinc salt of dimethyldithiocarbamic acid; tellurium diethyldithiocarbamate ("Tellurac"); zinc dibutyldithiocarbamate; the thiazole derivatives include 2,2′-dithiobis benzothiazole (MBTS) and 2-mercaptobenzothiazole (MBT). Representative sulfenamides include N-cyclohexyl 2-benzothiazole sulfenamide ("Conac S"); morpholinyl mercapto N-tertiary butyl-2-benzothiazole sulfenamide ("Santocure NS"). Representative aryl imidazole derivatives include 2-mercapto imidazoline ("NA–22") and 2-mercapto-4,4,6-trimethyl dihydropyrimidine ("Thiate A").

It is to be understood that various modifications of the sulfur curing procedure may be employed depending upon the stock. Various procedures and modifications of sulfur curing are more particularly described in Encyclopedia of Chemical Technology, Kirk and Othmer, published by Inter-Science Encyclopedia, Inc., New York (1953), vol. 11, pages 892–927; Principles of High-Polymer Theory and Practice, Schmidt and Marlies, published by McGraw-Hill Book Co., New York (1948), pages 556–566; Chemistry and Technology of Rubber, Davis and Blake, published by Reinhold Publishing Corp., New York (1937), Chapter 6; Introduction to Rubber Technology, edited by M. Morton, Reinhold Publishing Corp., New York (1959), pages 93–129; The Applied Science of Rubber, edited by W. J. S. Naunton, Edward Arnold, Ltd., London (1961), pages 346–413, 992–1099.

It is to be understood that the compositions of the present invention can be vulcanized by the use of sulfur-bearing compounds which make the sulfur available under curing conditions. As is well known to those skilled in the art, representative examples of these compounds have bridges containing two or more sulfur atoms, e.g., disulfide groups and tetrasulfide groups. Tetralkythiuram disulfides, e.g., tetramethylthiuram disulfide, tetraethyl thiuram disulfide, and dipentamethylene thiuram tetrasulfide, are valuable compounds of this type. Dithiocarbamates, such as selenium dimethyl dithiocarbamate and selenium diethyl dithiocarbamate, and 4,4'-dithiodimorpholine are additional examples of useful compounds.

Further information is given in literature such as the following: Vanderbilt Rubber Handbook, R. T. Vanderbilt Company, 230 Park Ave., New York, N.Y., 1958, pages 159, 172–173, 179, 240, 249; Chemistry of Natural and Synthetic Rubbers, H. L. Fisher, Reinhold Publishing Corporation, New York, 1957, pages 30–31; The Applied Science of Rubber, pages 400, 1044–1048; Rubber, Fundamentals of Its Science and Technology, page 171; Synthetic Rubber Technology, pages 27–28, 240–241; Bulletin BL-316, Tetrone A, Elastomers Division, E. I. du Pont de Nemours and Co., Inc. Wilmington, Del.; 1959 Catalogue of Du Pont Elastomers and Chemicals, Elastomer Chemicals Department, E. I. du Pont de Nemours and Co., Inc., Wilmington, Del., pages 34, 36 and 37.

In place of sulfur curing, which is preferred, one may employ a free radical cure.

In carrying out a free radical cure of the copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50°–175° C. for a period of 30 minutes to several hours is ordinarily adequate. Longer times may be used in the case of the more thermally stable free radical generators.

The prefered free radical generators which may be incorporated with the copolymers are organic peroxides. Representative examples are bis(alpha-dimethylbenzyl) peroxide, dibenzoyl peroxide, di-tert-butyl peroxide, cumene hydroperoxide, methyl ethyl ketone peroxide, tert-butyl perbenzoate and di-N-methyl tert-butyl percarbamate. Bis(alpha,alpha-dimethylbenzyl) peroxide, often called dicumyl peroxide, and 2,5-bis(tert-butyl-peroxide)-2,5-dimethylhexane are particularly preferred. About 2.5 to 3 parts by weight is used for evry 100 parts by weight of the copolymer. The compounded stock is then cured at about 150° C. for about 30 to 60 minutes.

In addition to the free radical generator, a free radical acceptor may be present such as N-substituted maleimide, an N,N'-substituted bismaleimide, an N,N'-substituted bisacrylamide, a cyclic triacryloylhexahydrotriazine, or mixtures thereof. The quantity of free radical acceptor may range from about 0.5% to 6% by weight of the copolymer. The weight of the free radical acceptor may be less, equal to, or more than the weight of the free radical generator.

The saturated hydrocarbon copolymers which can be used in the present invention are made by copolymerizing 2 or more alpha-olefins of the formula: $CH_2=CH-R$ where R is H or $C_1-C_{16}$ alkyl. It is preferred that these copolymers contain about 20–75 weight percent ethylene monomer units and that the alpha-olefins be straight-chained. Suitable vulcanizates are obtainable by the use of conventional curing agents, such as sulfur or dicumyl peroxide. Vulcanizates of these preferred copolmyers are elastomeric.

Representative examples of useful alpha-monoolefins having the structure $CH_2=CH-R$ include: ethylene; propylene; 1-butent; 4-methyl-1-pentene; 1-pentene; 1-heptene; 1-hexene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,7,7-trimethyl-1-heptene; 1-dodecene; and 1-octadecene.

Alpha monoolefin copolymers and processes for the preparation are more particularly described in the following references: U.S. Patent 3,000,867; U.S. Patent 2,975,159; British Patent 857,183. Processes suitable for use in making the copolymers are described in the following patents:

| United States: | United States: |
|---|---|
| 2,839,518 | 2,968,650 |
| 2,862,917 | 2,989,515 |
| 2,879,263 | 2,989,487 |
| 2,888,448 | 2,992,190 |
| 2,890,214 | 3,014,020 |
| 2,899,415 | 3,026,269 |
| 2,900,372 | 3,042,626 |
| 2,905,645 | 3,050,471 |
| 2,907,757 | Great Britain: |
| 2,909,512 | 810,210 |
| 2,939,845 | 787,375 |
| 2,943,066 | 777,414 |
| 2,943,081 | 778,639 |
| 2,953,531 | 777,538 |
| 2,962,451 | 776,306 |
| 3,038,863 | |

A wide variety of mineral fillers can be employed. Representative examples include calcined kaolin clay which is preferred, blanc fixe, titanium dioxide, zinc oxide, magnesium silicate, esterified silica, hard and soft kaolin clays, fine particles talc, and whiting. For the purposes of the present invention, carbon is not considered a "mineral filler" or "mineral loading." It is to be understood that a very minor amount of carbon black can be present (e.g. 20% by weight or less of total filler weight) for color coding and the like. The amount of filler to be used will depend upon the particular application desired and can be varied by those skilled in the art according to routine experiments. Typical loaded compositions contain 80 to 200 parts of filler per 100 parts by weight of copolymer. Mixtures of mineral fillers in any proportion may be employed when desired.

The copolymers can be oil extended. Thus one can make normally solid mixtures comprising (a) 1 or more of the copolymers and (b) a petroleum oil having a flash point of at least about 300° F. and a viscosity-gravity constant in the range 0.80 to 1.0. As is well known to those skilled in the art, the viscosity-gravity constant of a particular petroleum oil can be easily used to classify the oil as paraffinic, relatively paraffinic, naphthenic, relatively aromatic, aromatic, very aromatic, or extremely aromatic. The more aromatic the oil, the higher the viscosity-gravity constant. The particularly preferred oils are the intermediate types called relatively paraffinic, naphthenic, and relatively aromatic having viscosity-gravity constants in the range of about 0.820–0.949.

The petroleum oil can be introduced into the dry polymer stock, for example, in a Banbury mixer or on a rubber roll mill, prior to cure, or it can be added to a polymer solution prior to removal of the solvent or it can be mixed with a polymer slurry before the latter reaches an extruder drier or it can be added to copolymer crumbs obtained by washing a slurry, the oil-crumb dispersion then being sent to an extruder drier. Oil extension of the mineral loaded stocks is also possible.

In operating the present invention one skilled in the art introduces an electrically stabilizing amount of the organosilicon compound into the mineral loaded copolymer composition prior to curing. The proportion of organosilicon stabilizer needed will depend upon the organosilicon compound itself and the particular stock being employed. Some stocks which are particularly difficult to stabilize, such as those containing calcined clay, will require larger proportions of stabilizer than those containing the fillers such as magnesium silicate which are sometimes preferred for use in electrical applications. Those skilled in the art can readily determine the proportion of stabilizer needed by means of routine experiments wherein the proportion of organosilicon compound is varied and the electrical properties of the resulting vulcanizates are tested.

The organosilicon compound (or mixture of 2 thereof) can be added at any time prior to cure. The composition being vulcanized can be compounded in any order desired as is convenient in the particular case. Compounding can be carried out by any means familiar to those skilled in the art; rubber roll mills, Banbury mixers, and the like are suitable devices. Heat-treated stocks can be employed.

The stocks obtained can be vulcanized by the procedures familiar to those skilled in the art. Generally, vulcanization is accomplished by heating the compounded stock (frequently in a mold or on a wire) at a temperature ranging between about 130 and about 160° C. for about 10–90 minutes for press cures or 15–300 seconds at 225 lb./sq. in. steam pressure for steam cures. Typical press cures are made at 320° F. for 20 minutes. Typical steam cures are made for 30–60 seconds at 225 lb./sq. in. steam pressure.

The following examples in which part and percent are by weight, unless otherwise noted, are representative of the process of the present invention and new copolymer compositions employed therewith. In these examples the expression "phr." means "parts per hundred parts of copolymer."

EXAMPLE 1

Copolymer A

Copolymer A was an ethylene/propylene/1,4-hexadiene copolymer prepared in accordance with the general directions of U.S. Patent 2,933,480 using a diisobutyl aluminum chloride/vanadium oxytrichloride catalyst and tetrachloroethylene solvent. Representative samples of this copolymer had about 40–45% propylene and 3.5–4.8% 1,4-hexadiene monomer units by weight and exhibited Mooney (ML–4/100° C.) viscosity values of 80–94.

A curable composition (A) was prepared on a rubber roll mill according to the following recipe:

| Component: | Parts |
|---|---|
| Copolymer A | 100 |
| 2-(1,3-butadienyl) methyl polysiloxane | 3 |
| Zinc oxide | 5 |
| Sulfur | 3 |
| Calcined clay | 120 |
| Naphthenic petroleum oil | 40 |
| Tetramethylthiuram monosulfied | 1.5 |
| 2-mercaptobenzothiazole | 0.5 |

A control stock (B) was compounded according to the above recipe except that the silicone was omitted.

The stocks prepared were cured in a press at 160° C. for 15 minutes. The vulcanizates obtained were then tested for power factor and specific inductive capacitance stability. Table I shows the results.

TABLE I

| Aging Time [1] | A Power Factor | B [2] Power Factor | A S.I.C. | B [2] S.I.C. |
|---|---|---|---|---|
| Initial | 0.35 | 0.36 | 3.09 | 3.10 |
| 1 day | 0.42 | 15.67 | 3.14 | 5.67 |
| 7 days | 1.46 | | 3.17 | |

[1] In water at 75° C.   [2] Control.

EXAMPLE 2

Organosilicon compound

The organosilicon compound was a dimethyl polysiloxane having vinyl and phenyl groups attached; its specific gravity was 0.98 at 25° C. (Commercially available from Dow-Corning Corp., Midland, Mich. as Silastic 440.)

Five compositions were prepared on a rubber roll mill according to the procedure for Example 1 except that the 2-(1,3-butadienyl) methyl polysiloxane was replaced by the organosilicon gum described above according to the following recipe:

| Stabilizer: | Organosilicon cpd. |
|---|---|
| A | 0.5 |
| B | 1 |
| C | 2 |
| D | 3 |
| E (control) | 0 |

The stocks thereby prepared were cured for 15 minutes at 160° C. The power factor stability of the resulting vulcanizate was tested. Table II below gives the results.

TABLE II.—POWER FACTOR STABILITY

| Aging Time [1] | A | B | C | D | E [2] |
|---|---|---|---|---|---|
| Initial | 0.41 | 0.41 | 0.43 | 0.42 | 0.37 |
| 1 day | 5.76 | 4.24 | 3.11 | 3.50 | 12.12 |
| 7 days | 3.99 | 2.86 | 2.19 | 2.12 | 12.19 |
| 14 days | 3.13 | 2.20 | 1.64 | 1.65 | 12.09 |

[1] In water at 75° C.   [2] Control.

The specific inductive capacitance stability of the vulcanizates was also studied. Table III below gives the data.

TABLE III.—S.I.C. STABILITY

| Aging time [1] | A | B | C | D | E [2] |
|---|---|---|---|---|---|
| Initial | 3.19 | 3.23 | 3.24 | 3.14 | 3.15 |
| 1 day | 4.06 | 3.81 | 3.62 | 3.52 | 6.68 |
| 7 days | 4.32 | 3.97 | 3.72 | 3.62 | 7.09 |
| 14 days | 4.50 | 4.14 | 3.86 | 3.82 | 7.05 |

[1] In water at 75° C.   [2] Control.

EXAMPLE 3

The procedure of Example 1 was repeated except that the 2-(1,3-butadiene)methyl polysiloxane was replaced by the organosilicon compounds described below.

Organosilicon compound A

Compound A was triethoxyvinyl silane commercially available from Union Carbide as A–151.

Organosilicon compound B

Compound B was vinyl tris (2-methoxyethoxy) silane available from Union Carbide as A–172.

Stocks A and B containing 3 phr. of organosilicon compounds A and B, respectively, as well as a composition C containing no organosilicon compound (provided for purposes of comparison), were cured for 15 minutes at 160° C. The electrical properties of the vulcanizates were as follows:

TABLE IV

| Aging Time [1] | A Power Factor | B Power Factor | C [2] Power Factor | A S.I.C. | B S.I.C. | C [2] S.I.C. |
|---|---|---|---|---|---|---|
| Initial | 0.40 | 0.40 | 0.36 | 3.24 | 3.15 | 3.24 |
| 1 day | 2.48 | 3.19 | 44.39 | 3.43 | 3.43 | 16.66 |
| 7 days | 3.01 | 2.53 | 40.60 | 4.07 | 3.80 | 22.98 |
| 14 days | 2.92 | 2.15 | [3] | 4.15 | 3.87 | [3] |

[1] In water at 75° C.   [2] Control.   [3] Not determined.

EXAMPLE 4

Organosilicon compound C

Organosilicon compound C is a soft wax freezing at 32–35° C.; it displays a viscosity of 200–400 cstks. at 35° C. (when melted) and has a pour point of 42° C.; it is completely water soluble at room temperature, the inverse solubility point (Cloud point) being 79° C. This compound is commercially available from the Silicone Division of Union Carbide Corporation as organosilicone copolymer L-5310.

Preparation of vulcanizates

Four stocks (A–D) were compounded on a rubber roll mill at 75–100° F. according to the recipe of Example 1 except that the following organic silicone compounds were substituted for the 2-(1,3-butadienyl)methyl polysiloxane.

Stock:
- A _____ Organic silicon compound
- B _____ Compound of Example 2.
- C _____ Compound A of Example 3.
- D _____ Compound C of present example.
  None used.

Stocks C and D, which were outside the scope of the present invention, were made for purposes of comparison.

All stocks were cured for 15 minutes at 160° C.

The electrical properties of the vulcanizates were as follows:

| Stock | Power Factor | | | |
|---|---|---|---|---|
| | A | B | C | D |
| Organosilicon cpd | Insoluble | Insoluble | Soluble | (None) |
| Aging Time:[1] | | | | |
| Initial | 0.40 | 0.35 | 13.57 | 0.34 |
| 1 Day | 2.90 | 2.70 | 41.85 | 38.20 |
| 7 Days | 2.30 | 2.43 | 55.90 | 37.58 |
| 14 Days | 1.76 | 2.55 | 20.56 | 33.54 |

[1] See footnote at the end of table.

| Stock | S.I.C. | | | |
|---|---|---|---|---|
| | A | B | C | D |
| Organosilicon cpd | Insoluble | Insoluble | Soluble | (None) |
| Aging Time:[1] | | | | |
| Initial | 3.1 | 3.16 | 3.67 | 3.26 |
| 1 Day | 3.39 | 3.57 | 33.63 | 15.05 |
| 7 Days | 3.59 | 4.09 | 55.08 | 18.51 |
| 14 Days | 3.58 | 4.10 | 5.95 | 14.07 |

[1] Aged in water at 75° C.

As many widely different embodiments of this invention may be made without departing from the spirit and scope thereof, it is to be understood that this invention is not limited to the specific embodiments thereof except as defined in the appended claim.

What is claimed is:

1. A process for improving the electrical properties of mineral-filled hydrocarbon selected from the group consisting of (1) chain-saturated hydrocarbon copolymers of at least $\alpha$-monoolefin and at least one non-conjugated diene, and (2) hydrocarbon copolymers made from at least two $\alpha$-monoolefins comprising curing said composition in the presence of a stabilizing amount of vinyl tris (2-methoxyethoxy)silane which is insoluble in water at about 75° C.

References Cited

UNITED STATES PATENTS

| | | | |
|---|---|---|---|
| 2,831,829 | 4/1958 | Brooks et al. | 260—41.5 |
| 3,228,883 | 1/1966 | Giulio et al. | 252—63.2 |
| 3,239,481 | 3/1966 | Meier et al. | 260—41 |
| 3,271,355 | 9/1966 | Vanderbilt et al. | 260—41.5 |
| 3,227,777 | 1/1966 | Safford | 260—827 |
| 3,278,480 | 10/1966 | Radcliff | 260—41 |

J. H. DERRINGTON, *Primary Examiner.*

M. LIEBMAN, *Assistant Examiner.*

U.S. Cl. X.R.

260—41, 824, 827; 252—63.2

UNITED STATES PATENT OFFICE
CERTIFICATE OF CORRECTION

Patent No. 3,425,983　　　　　　　　　　　　　February 4, 1969

James Richard Wolfe, Jr.

It is certified that error appears in the above identified patent and that said Letters Patent are hereby corrected as shown below:

Column 10, line 20, after "least" insert -- one --.

Signed and sealed this 24th day of March 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents